United States Patent [19]

Strickland

[11] Patent Number: 5,780,000
[45] Date of Patent: Jul. 14, 1998

[54] USE OF Z-SORB PROCESS AS CATALYTIC INCINERATOR FOR TAIL GAS FROM SULFUR PLANTS

[75] Inventor: James F. Strickland, Stafford, Tex.

[73] Assignee: Gas Research Institute, Chicago, Ill.

[21] Appl. No.: 711,456

[22] Filed: Sep. 9, 1996

[51] Int. Cl.[6] ................................................ B01D 53/52
[52] U.S. Cl. .................. 423/220; 423/230; 423/244.06; 423/539; 95/136
[58] Field of Search ........................... 95/97, 98, 99, 95/136; 423/230, 220, 244.01, 244.06, 539

[56] References Cited

U.S. PATENT DOCUMENTS

| | | | |
|---|---|---|---|
| 3,615,197 | 10/1971 | Jaeger | 23/176 |
| 4,055,401 | 10/1977 | Beavon et al. | 23/277 |
| 4,088,744 | 5/1978 | Reed et al. | 423/573 |
| 4,123,507 | 10/1978 | Hass | 423/573 |
| 4,180,554 | 12/1979 | Goddin, Jr. et al. | 423/574 R |
| 4,255,408 | 3/1981 | Sims | 423/571 R |
| 4,296,088 | 10/1981 | Staueffer | 423/533 |
| 4,309,402 | 1/1982 | Al-Muddarris | 423/574 R |
| 4,331,630 | 5/1982 | Van Pool | 422/160 |
| 4,462,977 | 7/1984 | Reed | 423/574 R |
| 4,507,275 | 3/1985 | Reed | 423/574 R |
| 4,533,529 | 8/1985 | Lee | 423/230 |
| 4,552,747 | 11/1985 | Goar | 423/574 R |
| 4,769,229 | 9/1988 | McGalliard | 423/574 R |
| 4,849,202 | 7/1989 | Lee | 423/574 R |
| 4,871,521 | 10/1989 | Pendergraft | 423/230 |
| 4,954,331 | 9/1990 | Lee et al. | 423/574 R |

FOREIGN PATENT DOCUMENTS

0256741 A2  2/1988  European Pat. Off. ............... 423/230

OTHER PUBLICATIONS

Document distributed at AIChE 1990 Summer National Meeting (San Diego Aug. 19–22, 1990) titled *Z–Sorb—A New Sulfur Removal Process* by F.M. Brinkmeyer and G.A. Delzer, Phillips Petroleum Company.

Primary Examiner—Gary P. Straub
Assistant Examiner—Timothy C. Vanoy
Attorney, Agent, or Firm—Dick and Harris

[57] ABSTRACT

An apparatus and process for removing and incinerating sulfur from tail gas being emitted from a Claus Recovery Sulfur Unit (SRU) or a Tail Gas Clean-up Unit (TGCU) is provided. The gas is processed in a Z-Sorb™ type sulfur absorber wherein the off-gas, after the hydrogen sulfide is removed, is combusted and used as a regenerative gas for a second absorber, that has been used to sorb hydrogen sulfide out of a gas, so as to release sulfur dioxide from the second absorber—in lieu of "process to substantially convert the hydrogen sulfide to sulfur dioxide, toward precluding the need for combustion of the hydrogen sulfide.

12 Claims, 2 Drawing Sheets

USE OF Z-SORB PROCESS AS CATALYTIC INCINERATOR FOR TAIL GAS FROM SULFUR PLANTS

BACKGROUND OF THE INVENTION

1. Field of the Invention

The present invention relates to methods and apparatus for the treatment of sulfur-laden gases, such as the gases which are produced in a Claus Recovery Sulfur Unit, or other generally similar types of sulfur plants.

2. The Prior Art

In many environmental jurisdictions, it is necessary to reduce the level of hydrogen sulfide in the tail gas of a Claus Recovery Sulfur Unit (SRU) or the treated gas from a Tail Gas Clean-up Unit (TGCU) to less than 10 parts per million (PPM) before the gas can be released to the atmosphere. The reduction in the level of hydrogen sulfide is typically accomplished by heating the tail gas to at least 1500° F. in a combustor where the hydrogen sulfide is converted to sulfur dioxide. The ability of the combustor to meet the required maximum level of ten parts per million or less hydrogen sulfide is strongly dependent on the combustor temperature and thus requires the consumption of considerable amounts of fuel gas.

It would accordingly be desirable to provide a method for reducing the level of hydrogen sulfide gas in such processes which is more economical and does not result in unnecessary utilization of excess fuel gas merely in order to accomplish the incineration of the hydrogen sulfide.

It would further be desirable to provide an alternative method for the reduction of hydrogen sulfide in tail gas from various sulfur plants which has an improved level of effectiveness.

SUMMARY OF THE INVENTION

The liquid oxidation-reduction process known as Z-Sorb is utilized to remove hydrogen sulfide from tail gas from a sulfur plant. The process provides for the conversion of hydrogen sulfide into sulfur dioxide prior to arrival of the tail gas at the vent stack, thus leading to a substantial reduction in utilization of fuel gas. Otherwise, fuel gas must be used to convert the $H_2S$ to $SO_2$ by heating the tail gas stream to approximately 1500° F. from about 300° F.

BEST MODE FOR CARRYING OUT THE INVENTION

Figure 1:
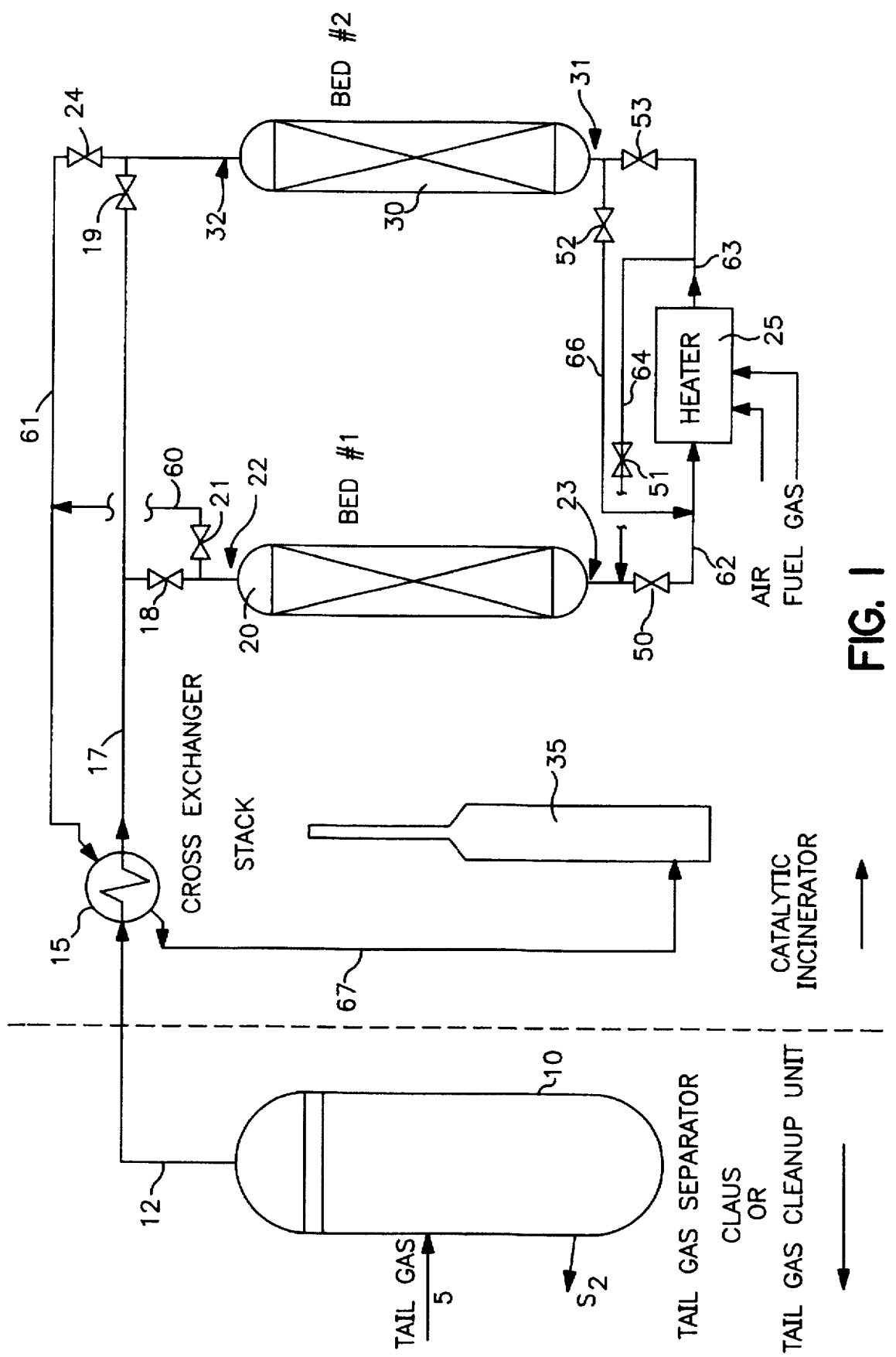
FIG. 1 is a schematic illustration of the catalytic process according to one preferred embodiment of the invention.

While this invention is susceptible of embodiment in many different forms, there is shown in the drawings and will be described herein in detail, a preferred embodiment, with the understanding that the present disclosure is to be considered as an exemplification of the principles of the invention, and is not intended to limit the invention to the embodiment illustrated.

FIG. 1 is a schematic illustration of a process for the reduction of hydrogen sulfide in a tail gas from an industrial process, such as a Claus process or a tail gas clean-up unit.

The physical components which are utilized in the process according to FIG. 1 include a tail gas separator 10, cross heat exchanger 15, a first absorber bed 20, a heater 25, a second absorber bed 30 and a stack 35.

In a preferred embodiment of the invention, each of absorber beds 20 and 30 is filled with an active catalytic hydrogen sulfide-absorbent component which is commercially known in association with the Z-Sorb™ process, originally developed by Phillips Petroleum Corporation. It is understood that the principal active ingredient utilized in the Z-Sorb process is a zinc oxide based material.

Tail gas, such as may be produced by a Claus sulfur recovery plant is introduced into a tail gas separator (which may be of conventional configuration) at 5. The composition of the tail gas will be such that there will be approximately two hydrogen sulfide molecules to every one sulfur dioxide molecule, with the concentration of hydrogen sulfide typically being in the range of 50 to 5000 parts per million. The tail gas separator acts to separate elemental sulfur from the tail gas. The tail gas, having the elemental sulfur removed, exits tail gas separator 10 at 12. At this point in the process, the tail gas will have a temperature of approximately 300° F.

In a preferred embodiment of the invention, the fluid connections between the absorbers 20 and 30 and heater 25 will be set up so that as the reactive material in one absorber, for example absorber 20, becomes saturated, at the same time, the reactive material in the other absorber 30 is being regenerated.

In a typical preferred embodiment of the invention, a number of two-way valves will be provided, controlled by suitable valve actuators (not shown) of conventional configuration and controlled by a suitable control device (also not shown), such as an appropriately programmed microprocessor, PC-based computer, etc.

In one mode of operation, valve 18 will be open, valve 21 will be closed, valve 50 will be open, valve 51 will be closed, valve 53 will be open, valve 52 will be closed, valve 19 will be closed and valve 24 will be open. The tail gas is thus passed through cross heat exchanger 15 after which at 17 the heated tail gas (as will be further described hereinafter) will have a temperature of approximately 750° F. The heated tail gas containing hydrogen sulfide and sulfur dioxide passes through valve 18 and enters at 22 into absorber bed 20, where hydrogen sulfide is absorbed by the catalytic absorbent material. The amount of hydrogen sulfide which may be remaining in the gas upon exit of absorbent bed 20 at exit 23 will be on the order of five parts per million. The remaining significant components of the gas, upon departure from absorber bed 20, will be sulfur dioxide, nitrogen and carbonyl sulfide. The temperature of the gas on departure from absorber bed 20 is only slightly above the temperature going in. The gases are then directed through valve 50 through line 62 into a heater 25. The gases are passed directly through the combustion region within heater 25, which is fed fuel gas (which may be any suitable form of fuel gas which as been cleaned of sulfur) and oxygen. The treated tail gas and combustion products depart heater 25, pass through line 63 into valve 53 at a temperature of approximately 1000° F. These heated gases are then passed through line 65 into a second absorber bed 30 at 31, which bed 30 has already been used to absorb hydrogen sulfide.

Accordingly, the absorbent (preferably zinc oxide material) in absorber bed 20 may, and preferably, will be saturated with sulfur substantially to its capacity, prior to passage of the heated tail gas remnants and combustion products. As a result of the heating action of the heated tail gas remnants and combustion products, together with excess air, the absorbent material is regenerated in the second absorbent bed 30. Exiting absorbent bed 30 are water vapor and sulfur dioxide gas, at a temperature substantially the same as before entry into absorber bed 30, namely approximately 1000° F. This heated gas exits bed 30 at 32, and passes through valve 24 along line 61 to be utilized to provide the heat for cross exchanger 15. After passage through cross exchanger 15, some heat has been given up and the temperature of the $SO_2$ and water vapor bearing gases have been reduced on the order of 450° F., to a temperature in the range of 500° to 600° F. The gases are then directed in line 67 to be vented in stack 35, utilizing substantially less fuel gas and requiring substantially lower temperatures than in a conventional incinerator which requires the gas temperature to be raised to about 1500° F. in order to convert the $H_2S$ to $SO_2$.

The just described flow path can be used until the absorbent in bed 20 becomes saturated with hydrogen sulfide and the absorbent becomes incapable of further useful absorbing activity. In order to enable the apparatus and method of the present invention to proceed in a substantially continuous manner, the direction of flow of the gas through the two beds 20 and 30 will be reversed, so that the saturated bed will release the sulfur in the form of $SO_2$ and the regenerated bed will absorb the $H_2S$ from the incoming sour gas.

One method by which the control of the reversal of the flow direction is accomplished is by a timing method. Since the sulfur content of the gas leaving separator 10 will be known by either calculation or direct sensing, and the rate of flow of the gas from separator 10 will either be controlled, calculated or sensed, and the rate at which beds 20 and 30 absorb and/or release $H_2S$ or $SO_2$ respectively can be calculated from the physical dimensions of the beds and the amount of catalytic material in each bed (which will preferably be the same in each bed) or empirically determined, the amount of time required for each to become saturated and/or regenerated can be determined accordingly to conventional calculation techniques.

In a preferred embodiment of the invention, the apparatus will be configured so that the amount of time required for one bed to become saturated will be substantially the same as the amount of time required for the other bed to simultaneously regenerate by releasing $SO_2$. Accordingly, the control device will be suitably programmed to measure the time interval starting from the time the various previously mentioned valves were put into the configuration described above. When the control device (not shown) has measured an amount of time corresponding to substantially complete saturation/regeneration of the respective beds, the control device will then actuate the various two-way valves, so as to close valve 18, open valve 21, close valve 50, open valve 51, close valve 53, open valve 52, close valve 24 and open valve 19. Thus, the flow of gas through the system will be through cross exchanger 15, through line 17 to valve 19 and into bed 30 at 32, where the regenerated absorbent proceeds to absorb hydrogen sulfide from the gas. The gas then exits bed 30 at 31 and passes through valve 52, through line 66 to line 62 and into heater 25. After being heated and mixed with the combustion products, the heated, treated gas exits heater 25 and proceeds from line 63 to line 64, and passes through valve 51 and into bed 20, where the heated gas enters bed 20 at 23. The heated gas serves to accomplish the regeneration of the absorbent in bed 20. The sulfur dioxide and water vapor exit bed 20 at 22 and then pass through valve 21 along line 60 to line 61 and proceeds through cross exchanger 15 and on to vent stack 35.

The flow path will continue along this just-described reverse flow path until the control device measures again an amount of elapsed time corresponding to the saturation of bed 30 and regeneration of bed 20. At such time the control device will cause the valves to revert to the positions described with respect to the first mode of operation.

In this manner, through alternating the flow paths and the functions of the two absorber beds, the treatment process can continue in a more or less continuous manner.

Figure 2:
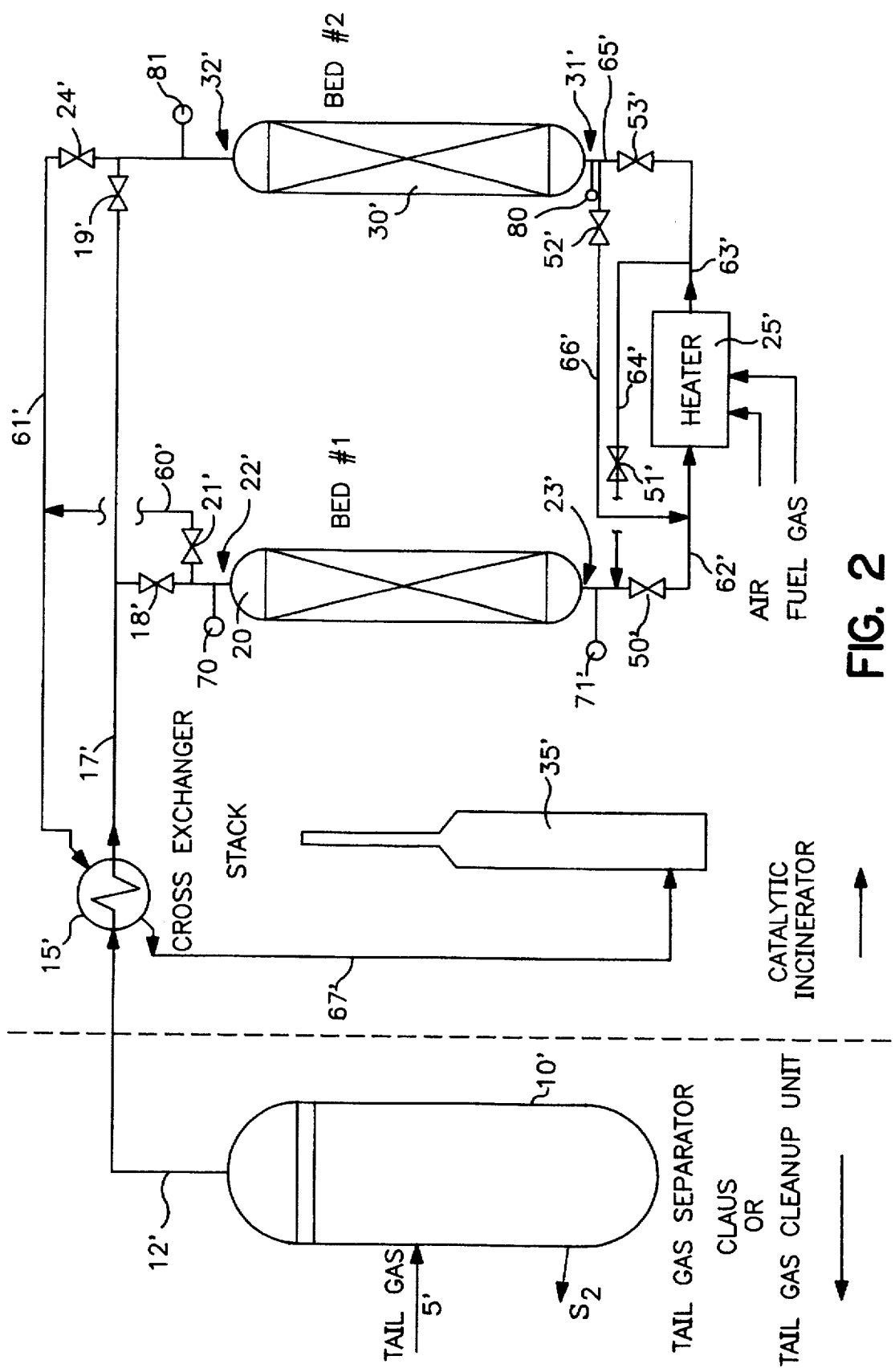
FIG. 2 is a schematic illustration of the catalytic process according to another preferred embodiment of the invention.

FIG. 2 is a schematic illustration of an alternative process for the reduction of hydrogen sulfide in a tail gas from an industrial process, such as a Claus process or a tail gas clean-up unit.

The physical components which are utilized in the process according to FIG. 2 are substantially identical to those described with respect to the embodiment of FIG. 1. Accordingly, elements described in the embodiment of FIG. 2, the functions and/or structure of which are similar or the same as elements described with respect to the embodiment of FIG. 1, will be identified with like reference numerals augmented with a prime (').

The apparatus of FIG. 2 include a tail gas separator 10', cross heat exchanger 15', a first absorber bed 20', a heater 25', a second absorber bed 30' and a vent stack 35'.

In this second embodiment of the invention, each of absorber beds 20' and 30' is likewise filled with an active catalytic hydrogen sulfide-absorbent component which is commercially known in association with the Z-Sorb™ process, originally developed by Phillips Petroleum Corporation. It is understood that the principal active ingredient utilized in the Z-Sorb process is a zinc oxide based material.

Tail gas, such as may be produced by a Claus sulfur recovery plant is introduced into a tail gas separator 10' (which may be of conventional configuration) at 5'. The composition of the tail gas will be such that there will be approximately two hydrogen sulfide molecules for each sulfur dioxide molecule, with the concentration of hydrogen sulfide typically being in the range of 50 to 5000 parts per million. The tail gas separator acts to separate elemental sulfur from the tail gas. The tail gas, having the elemental sulfur removed, exits tail gas separator 10' at 12'. At this point in the process, the tail gas will have a temperature of approximately 300° F.

In a preferred embodiment of the invention, the fluid connections between the absorbers 20' and 30' and heater 25' will be set up so that as the reactive material in one absorber, for example absorber 20', becomes saturated, at the same time, the reactive material in the other absorber 30' is being regenerated.

In a typical preferred embodiment of the invention, a number of two-way valves will be provided which will be controlled by suitable valve actuators (not shown) of conventional configuration and controlled by a suitable control device (also not shown), such as an appropriately programmed micro-processor, PC-based computer, etc.

In one mode of operation, valve 18' will be open, valve 21' will be closed, valve 50' will be open, valve 51' will be closed, valve 53' will be open, valve 52 will be closed, valve 19' will be closed and valve 24' will be open. The tail gas is thus passed through cross heat exchanger 15' after which at 17' the heated tail gas (as will be further described hereinafter) will have a temperature of approximately 750° F. The heated tail gas containing hydrogen sulfide and sulfur dioxide passes through valve 18' and enters at 22' into absorber bed 20', where hydrogen sulfide is absorbed by the catalytic absorbent material. The amount of hydrogen sulfide which may be remaining in the gas upon exit of absorbent bed 20' at exit 23' will be on the order of five parts per million. The remaining significant components of the gas, upon departure from absorber bed 20', will be sulfur dioxide, nitrogen and carbonyl sulfide. The temperature of the gas on departure from absorber bed 20' is only slightly above the temperature going in. The gases are then directed through valve 50' through line 62' into a heater 25'. The gases are passed directly through the combustion region within heater 25', which is fed fuel gas (which may be any suitable form of fuel gas which as been cleaned of sulfur) and oxygen. The treated tail gas and combustion products depart heater 25', pass through line 63' into valve 53' at a temperature of approximately 1000° F. These heated gases are then passed through line 65' into a second absorber bed 30' at 31', which bed 30' has already been used to absorb hydrogen sulfide. Accordingly, the absorbent (preferably zinc oxide material) in absorber bed 20' may, and preferably, will be saturated with sulfur to its capacity, prior to passage of the heated tail gas remnants and combustion products. As a result of the heating action of the heated tail gas remnants and combustion products, together with excess air, the absorbent material is regenerated in the second absorbent bed 30'. Exiting absorbent bed 30 are water vapor and sulfur dioxide gas, at a temperature substantially the same as before entry into absorber bed 30', namely approximately 1000° F. This heated gas exits bed 30' at 32', and passes through valve 24' along line 61' to be utilized to provide the heat for cross exchanger 15'. After passage through cross exchanger 15, some heat has been given up and the temperature of the SO$_2$ and water vapor bearing gases have been reduced on the order of 450° F., to a temperature in the range of 500° to 600° F. The gases are then directed in line 67' to be vented in stack 35', utilizing substantially less fuel gas and requiring substantially lower temperatures than in a conventional incinerator which requires the gas temperature to be raised to about 1500° F. in order to convert the H$_2$S to SO$_2$.

The just described flow path can be used until the absorbent in bed 20' becomes saturated with sulfur and the absorbent becomes incapable of further useful absorbing activity. In order to enable the apparatus and method of the present invention to proceed in a substantially continuous manner, the gaseous outputs of the absorber beds are monitored. For example, gas sensors 70 and 71, and 80 and 81, which may have configurations such as are known to those of ordinary skill in the art, will be positioned at the ends 22', 23' and 31', 32' of beds 20' and 30', respectively. Sensors 70, 71, 80, 81 will be connected directly or indirectly, to the previously described suitable control device through which the various two-way valves are controlled. These sensors 70, 71, 80, 81 will monitor the composition of the gases exiting the respective reaction vessels 20', 30'. Which sensors are being used during a particular mode of operation depends upon the direction of the flow of gas through the beds.

For example, in the mode of operation described above, if the quantity and/or concentration of hydrogen sulfide gas which exits vessel 20' and is sensed at exit 23' by sensor 71 exceeds some predetermined value, then the control device (not shown) will be programmed to recognize the condition as one signifying that the absorbent material within absorber 20' has become saturated and can no longer effectively react with the hydrogen sulfide gas. At or about the same time, presuming the beds are suitably similarly constructed, sensor 81 at 32' may detect that the quantity and/or concentration of sulfur dioxide gas and water being given off from absorber 30' drops below a certain predetermined value, indicating that the regeneration of the absorbent reactant material in absorber 30 has been substantially completed.

The control device will then actuate the various two-way valves, so as to close valve 18', open valve 21', close valve 50', open valve 51', close valve 53', open valve 52', close valve 24' and open valve 19'. Thus, the flow of gas through the system will be through cross exchanger 15', through line 17' to valve 19' and into bed 30' at 32', where the regenerated absorbent proceeds to absorb hydrogen sulfide from the gas. The gas then exits bed 30' at 31' and passes through valve 52', through line 66' to line 62' and into heater 25'. After being heated and mixed with the combustion products, the heated, treated gas exits heater 25' and proceeds from line 63' to line 64', and passes through valve 51' and into bed 20', where the heated gas enters bed 20' at 23'. The heated gas serves to accomplish the regeneration of the absorbent in bed 20'. The sulfur dioxide and water vapor exit bed 20' at 22' and then pass through valve 21' along line 60' to line 61' and proceeds through cross exchanger 15' and on to vent stack 35'.

The flow path will continue along this just-described flow path until such time as sensor 80 indicates that the gases exiting from absorber 30' show that the reactive material in bed 30' has become substantially saturated, and that the sensor 70 indicates that the gases exiting bed 20' show that the absorbent material in bed 20' has been regenerated. At such time the control device will cause the valves to revert to the positions described with respect to the first mode of operation.

In this manner, as in the previously described embodiment, through alternating the flow paths and the functions of the two absorber beds, the treatment process can continue in a more or less continuous manner.

As a further result of the use of the present system, the gases which are emitted from the stack will have a component of hydrogen sulfide which will be typically on the order of five parts per million if not less, far less than the ten parts per million maximum values which are typically required in according to environmental control standards.

The foregoing description and drawings merely serve to illustrate the invention and the invention is not limited thereto except insofar as the appended claims are so limited, as those skilled in the art who have the disclosure before them will be able to make modifications and variations therein without departing from the scope of the invention.

What is claimed is:

1. A method for removing hydrogen sulfide out of a Claus tail gas, the method comprising the steps of:
   preliminarily heating a gas containing hydrogen sulfide, wherein the gas is released from an initial gas discharge source;
   passing the preliminarily heated gas through a first reaction vessel containing therein an amount of a chemical agent effective to react with the hydrogen sulfide in the gas, so that at least a portion of the hydrogen sulfide has been removed from the gas, by absorption into the chemical agent;
   transporting all of the gas from the first reaction vessel, after at least a portion of the hydrogen sulfide has been removed, to a heating unit;
   introducing an oxidizing agent to the heating unit;
   secondarily heating all of the gas and the oxidizing agent in the heating unit; and
   passing all of the secondarily heated gas from the heating unit to and through a second reaction vessel which contains therein an amount of a chemical agent, which already has been used to absorb hydrogen sulfide from a gas, the chemical agent releasing sulfur dioxide upon exposure to the secondarily heated gas, the chemical agent in the second reaction vessel becoming regenerated and again capable of absorbing hydrogen sulfide.

2. The method of claim 1, wherein the step of secondarily heating all of the gas further comprises the steps of:

passing the gas into a combustion chamber;

introducing a fuel gas into the combustion chamber;

introducing a supply of combustion air into the combustion chamber, in sufficient amounts that following combustion of the fuel gas, there will be excess oxygen remaining in the gases resulting from the combustion of the fuel gas and the combustion air; and igniting the fuel gas and combustion air so as to heat the gas from which at least a portion of the hydrogen sulfide has been removed.

3. The method according to claim 1, further comprising the steps of:

reversing the flow of gas through the first and second reaction vessels upon substantial saturation of the chemical agent in the first reaction vessel by hydrogen sulfide and upon substantially complete release from the chemical agent in the second reaction vessel of sulfur dioxide.

4. The method according to claim 3, wherein the step of reversing the flow of gas further comprises the steps of:

measuring the elapsed time as the gas flows through the first and second reaction vessels; and initiating the reversal of flow when the elapsed time that has been measured corresponds to a condition in which the chemical agent in the first chamber has become substantially saturated and the chemical agent in the second chamber has substantially completely released sulfur dioxide.

5. The method according to claim 3, wherein the step of reversing the flow of gas further comprising the steps of:

monitoring the gases exiting the first reaction vessel;

determining when the material in the first reaction vessel is substantially no longer capable of reacting with hydrogen sulfide;

redirecting the gas directly to the second reaction vessel containing material which is capable of reacting with hydrogen sulfide.

6. The method according to claim 1, wherein the step of preliminarily heating the gas from the initial gas discharge source is accomplished by placing the gas into a heat exchange relationship with the secondarily heated gas exiting the second reaction vessel.

7. The method according to claim 1, further comprising the steps of:

monitoring the gases exiting from the second reaction vessel;

determining when the material in the second reaction vessel has been restored to a condition wherein the material is capable of reacting with hydrogen sulfide; and directing preliminarily heated gas containing hydrogen sulfide through the second reaction vessel instead of heated gas from which at least a portion of the hydrogen sulfide has already been removed.

8. The method according to claim 1, wherein the material in the first vessel is a zinc oxide based absorbent material.

9. The method according to claim 8, wherein the zinc oxide based material is a material used in the Z-sorb™ process, the Z-sorb™ process primarily employing the oxidation-reduction reactions $ZnO+H2S \rightarrow ZnS+H2O$, and, $ZnS+O2 \rightarrow ZnO+SO2$.

10. The method according to claim 1, wherein the material in the second vessel is a zinc oxide based absorbent material.

11. The method according to claim 10 wherein the zinc oxide based material is a material which is utilized in the Z-sorb™ process, the Z-sorb™ process primarily employing the oxidation-reduction reactions $ZnO+H2S \rightarrow ZnS+H2O$, and, $ZnS+O2 \rightarrow ZnO+SO2$.

12. The method according to claim 1, further comprising the step of:

venting the gas after passing the heated gas through a second reaction vessel.

* * * * *